(12) United States Patent
Yamparala et al.

(10) Patent No.: US 12,169,629 B2
(45) Date of Patent: Dec. 17, 2024

(54) VARYING MEMORY ERASE DEPTH ACCORDING TO BLOCK CHARACTERISTICS

(71) Applicant: Micron Technology, Inc., Boise, ID (US)

(72) Inventors: Sriteja Yamparala, Boise, ID (US); Tawalin Opastrakoon, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 18/223,933

(22) Filed: Jul. 19, 2023

(65) Prior Publication Data
US 2024/0069730 A1   Feb. 29, 2024

Related U.S. Application Data

(60) Provisional application No. 63/402,422, filed on Aug. 30, 2022.

(51) Int. Cl.
*G06F 3/06* (2006.01)
(52) U.S. Cl.
CPC ............ *G06F 3/0608* (2013.01); *G06F 3/064* (2013.01); *G06F 3/0652* (2013.01); *G06F 3/0673* (2013.01)

(58) Field of Classification Search
CPC ...... G06F 3/0608; G06F 3/064; G06F 3/0652; G06F 3/0673
See application file for complete search history.

(56) References Cited

U.S. PATENT DOCUMENTS

| | | | |
|---|---|---|---|
| 10,417,123 B1 * | 9/2019 | Souri | G06F 12/0253 |
| 2011/0051521 A1 * | 3/2011 | Levy | G11C 16/10 365/185.24 |
| 2015/0186072 A1 * | 7/2015 | Darragh | G11C 16/3495 711/103 |

* cited by examiner

*Primary Examiner* — Gurtej Bansal
(74) *Attorney, Agent, or Firm* — LOWENSTEIN SANDLER LLP

(57) ABSTRACT

A method can include identifying one or more candidate memory blocks that are available for garbage collection, determining a respective erase depth level for each candidate memory block based on one or more block characteristics of the candidate memory block, erasing the candidate memory blocks, wherein each of the candidate memory blocks is erased in accordance with the respective erase depth level determined for the candidate memory block, receiving a request to write data subsequent to erasing the candidate memory blocks, and, responsive to receiving the request to write data, selecting a first memory block from the erased candidate memory blocks in accordance with the respective erase depth level of each of the erased candidate memory blocks. The block characteristics of the candidate memory block can include a program erase count and/or a temperature of the candidate memory block.

20 Claims, 8 Drawing Sheets

| BLOCK CHARACTERISTICS DATA AND CLASSIFICATION 300 |||
|---|---|---|
| Block 302 | Program Erase Count 304 | Temp. Degrees C 306 |
| 2 | 1 (Shallow) | 71 (Shallow) |
| 13 | 91 (Medium) | 61 (Medium) |
| 15 | 101 (Deep) | 51 (Deep) |
| 28 | 1 (Shallow) | 52 (Deep) |
| 35 | 301 (Deep) | 61 (Medium) |
| 56 | 20 (Medium) | 92 (Shallow) |
| 63 | 3 (Shallow) | 41 (Deep) |
| 72 | 2 (Shallow) | 60 (Medium) |
| 82 | 324 (Deep) | 71 (Shallow) |
| 99 | 12 (Medium) | 59 (Deep) |

FIG. 3

| BLOCK ERASE DEPTH TABLE 400 ||
|---|---|
| Block 402 | Erase Level (or block pool) 404 |
| 2 | 1 (Shallow) |
| 13 | 2 (Medium) |
| 15 | 3 (Deep) |
| 28 | 2 (Medium) |
| 35 | 3 (Deep) |
| 56 | 1 (Shallow) |
| 63 | 2 (Medium) |
| 72 | 1 (Shallow) |
| 82 | 3 (Deep) |
| 99 | 2 (Medium) |

Identify one or more candidate memory blocks that are available for garbage collection
602

Determine a respective erase depth level for each candidate memory block based on one or more block characteristics of the candidate memory block
604

Erase the candidate memory blocks, wherein each of the candidate memory blocks is erased in accordance with the respective erase depth level determined for the candidate memory block
606

Receive a request to write data subsequent to erasing the candidate memory blocks
608

Responsive to receiving the request to write data, select a first memory block from the erased candidate memory blocks in accordance with the respective erase depth level of each of the erased candidate memory blocks
610

Write data to the first memory block in accordance with the request to write data
612

Receive a request to perform garbage collection on one or more available memory blocks
702

Generate a plurality of memory block pools, wherein each memory block pool is associated with a respective erase depth level, and each memory block pool includes one or more memory blocks that each satisfy one or more threshold characteristics associated with the respective erase depth level
704

Erase the memory blocks in each block pool based on the respective erase depth level associated with the block pool
706

Receive a request to write data
802

Identify a memory block pool that is associated with a shallowest erase depth level of a plurality of erase depth levels and includes an erased memory block
804

Write the data to the erased memory block
806

FIG. 8

VARYING MEMORY ERASE DEPTH ACCORDING TO BLOCK CHARACTERISTICS

RELATED APPLICATIONS

This application claims the benefit of U.S. Provisional Application No. 63/402,422, filed Aug. 30, 2022, the entire contents of which are hereby incorporated by reference herein.

TECHNICAL FIELD

Embodiments of the disclosure relate generally to memory sub-systems, and more specifically, relate to varying memory erase depth based on block characteristics.

BACKGROUND

A memory sub-system can be a storage system, a memory module, or a hybrid of a storage device and memory module. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure. The drawings, however, should not be taken to limit the disclosure to the specific embodiments, but are for explanation and understanding only.

FIG. 3 illustrates example memory block characteristics data in accordance with some embodiments.

FIG. 4 illustrates an example block erase depth table in accordance with some embodiments.

FIG. 6 is a flow diagram of an example method to erase blocks that are available for garbage collection to respective depth levels determined based on characteristics of the blocks and to write to the erased blocks in order of their respective depth levels in accordance with some embodiments.

FIG. 7 is a flow diagram of an example method to erase a plurality of memory blocks that are available for garbage collection and generate a plurality of memory block pools based on characteristics of the memory blocks in accordance with some embodiments.

FIG. 8 is a flow diagram of an example method to write data to a particular erased memory block of a memory block pool that is associated with a shallowest erase depth of a plurality of erase depths in accordance with some embodiments.

DETAILED DESCRIPTION

Figure 1:
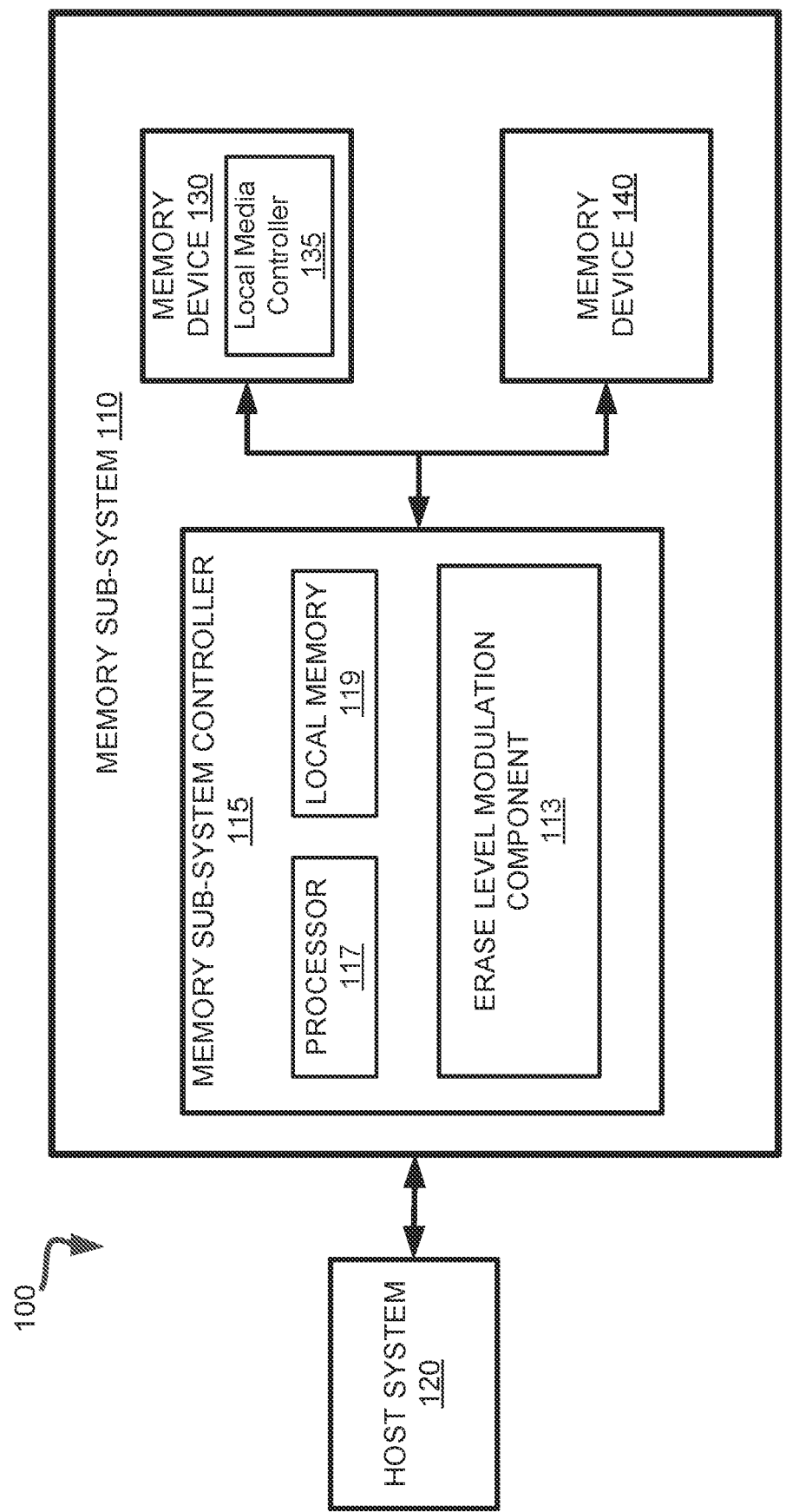
FIG. 1 illustrates an example computing system that includes a memory sub-system in accordance with some embodiments of the present disclosure.

Aspects of the present disclosure are directed to varying memory erase depth in a memory sub-system based on block characteristics. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can include one or more planes. For some types of non-volatile memory devices (e.g., NAND devices), each plane can include of a set of physical blocks. Each block can include of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

For some memory devices, such as NAND devices, blocks are the smallest units than can be erased, and thus pages within the blocks cannot be erased individually. A page of a block can contain valid data, invalid data, or no data. Invalid data is data that is marked as outdated as a new version of the data is stored on the memory device and/or is marked for erasure. Valid data is the most recent version of such data being stored on the memory device. A page that does not contain data can be a page that has been previously erased, or that has not yet been written to.

Although memory devices store data in pages and blocks of particular sizes, the memory sub-system can provide support for units of other sizes, and map the units to pages or physical blocks. Each such unit is referred to herein as a management unit, and can be, for example, a physical page, a physical block, a host logical block, a multiple of a physical block, or other suitable size. The data stored in each management unit can include metadata and/or host data. The host system can provide data to be stored at the memory sub-system, which the memory sub-system controller can store as management units.

A memory device can be made up of bits arranged in a two-dimensional or three-dimensional grid. Memory cells are formed onto a silicon wafer in an array of columns (also hereinafter referred to as bitlines) and rows (also hereinafter referred to as wordlines). A read operation can be performed using a signal (e.g., applied to a wordline of the memory array) having a read voltage level. The read threshold voltage level or value (herein the "read voltage level") can be a particular voltage that is applied to memory cells of a memory device to read the data stored at the memory cells.

For example, if a threshold voltage of a particular memory cell is identified as being below the read voltage level that is applied to the particular memory cell, then the data stored at the particular memory cell can be a particular value (e.g., '1') and if the threshold voltage of the particular memory cell is identified as being above the read voltage level, then the data stored at the particular memory cell can be another value (e.g., '0'). Thus, the read voltage level can be applied to memory cells to determine values stored at the memory cells.

In a conventional memory sub-system, when the threshold voltage programming distributions of a memory cell change, the application of the read voltage level can be inaccurate relative to the changed threshold voltage. For example, a memory cell can be programmed to have a threshold voltage below the read voltage level. The programmed threshold voltage can change over time and can shift to be above the read voltage level. For example, the threshold voltage of the memory cell can shift from initially being below the read voltage level to being above the read voltage level. As a result, when the read voltage level is applied to the memory cell, the data stored at the memory cell can be misread or misinterpreted to be at a wrong value as compared to the value as originally stored when the threshold voltage had not yet shifted.

For certain memory types (i.e., for memory sub-systems employing certain types of storage media), error rates can vary over time. In particular, some non-volatile memories have threshold voltage programming distributions that move or "drift" higher over time. At a given read voltage level (i.e., a value of the voltage applied to a memory cell as part of a read operation), if the threshold voltage programming distributions move, then certain reliability statistics can also be affected. One example of a reliability statistic is a bit error rate (BER). The BER can be defined as the ratio of the number of erroneous bits to the number of all data bits stored in a unit of the memory sub-system, where the unit can be the entire memory sub-system, a die of memory device, a collection of codewords, or any other meaningful portion of the memory sub-system.

A memory sub-system controller can perform media management operations, such as wear leveling, refresh, garbage collection, scrub, etc. A management unit (e.g., a block or a superblock) can include one or more pages containing valid data while the remaining pages can contain invalid data. To avoid waiting for a threshold number of pages in the management unit to have invalid data in order to erase and reuse the management unit, the memory sub-system controller can perform garbage collection operations to allow the management unit to be erased and released as a free management unit for subsequent write operations. Garbage collection is a set of media management operations that include, for example, selecting a block (or other management unit) that contains invalid data, identifying pages in the management unit that contain valid data, copying the valid data to new locations (e.g., free pages in another management unit), and erasing the selected block (or other management unit).

An erase operation can erase a block to a specified depth. The depth can represent an amount by which the threshold voltage of an erase distribution moves to lower voltage levels. The erase depth can be, for example, a shallow erase depth, a medium erase depth, or a deep erase depth (in order of increasing erase depth). The memory sub-system controller can specify the depth to which a memory block is erased. For example, the memory sub-system can specify sensing trim values that control a threshold erase-verify voltage, source and gate voltages, and/or other parameters to adjust the depth to which memory cells are erased. Deeper erase operations can cause the threshold voltages distributions to move to lower voltage levels (e.g., farther to the left) than shallow erase operations. Deeper erase operations can therefore provide a greater range for threshold voltage distributions, which can be desirable for multi-layer memory cells that use multiple programming levels, each represented by a threshold voltage distribution in a different range of voltages. However, an erase operation can cause memory device wear in proportion to the depth of the erase operation. Thus, a deep erase operation can reduce the endurance of the memory device by a greater amount than a shallow erase operation. Thus, the memory-subsystem can use deep erase operations for blocks to which data will be written in a multi-layer mode (e.g., triple-layer cell (TLC) or quadruple-layer cell (QLC)), since the deep erase provides a wider voltage range that is useful for storing several voltage distributions (e.g., 8 distributions in the case of a triple-layer cell). However, if data is to be written in a single-layer (SLC) mode, e.g., because there is a substantial amount of free memory available, then the memory sub-system can use shallow erase operations. The narrower voltage range provided by a shallower erase provides a sufficient voltage difference for the memory sub-system to distinguish between the erase distribution and the program distribution of SLC memory. Thus, deep erase is appropriate for multi-layer cell memory such as TLC or QLC, but causes unnecessary wear on SLC memory.

Garbage collection techniques include pre-emptive garbage collection and on-demand garbage collection. Pre-emptive garbage collection can perform the media management operations described above during times that the memory sub-system is otherwise idle. For example, during idle times, pre-emptive garbage collection can erase a memory block on which data has become invalid. A write operation can subsequently program data into the erased block. Since the erase operation is performed prior to receiving a read or write request, pre-emptive garbage collection does not generally degrade write response time and throughput by a substantial amount. However, there is a time delay between erasing and writing to a memory block. During the time delay, the threshold voltage programming distributions of the memory block can drift to higher read voltage levels. This threshold voltage drift can adversely affect reliability statistics such as bit error rate. Further, since pre-emptive garbage collection erases blocks prior to receiving write commands for the blocks, it is unknown at the time of the erase operation whether the block will be used in SLC mode or TLC/QLC mode. Thus, pre-emptive garage collection performs a deep erase so that the erased block can be used in SLC or TLC/QLC mode. As described above, the deep erase is not necessary for SLC mode, and therefore causes unnecessary wear on SLC memory.

On-demand garbage collection can perform media management operations when needed, e.g., in response to a write command, instead of during idle times. However, on-demand garbage collection increases the latency of write commands, since an erase is performed when a write command is received and prior to performing the program operation requested write command. This increased latency can cause a reduction in performance of the memory sub-system, particularly in write latency and throughput, which are some of the leading performance metrics noticed by users.

Aspects of the present disclosure address the above and other deficiencies by using an erase depth level modulation technique in which a garbage collection component determines a suitable erase level for each memory block that is a garbage collection candidate and erases the block to the determined erase level. The erase level can be, for example, a shallow level (suitable for SLC mode), a medium level (between shallow and deep), or a deep level (suitable for TLC/QLC mode). The garbage collection component thus erases each of the candidate blocks to a respective erase level. Subsequently, in response to write commands, the memory sub-system can program the erased blocks in order of their determined erase depths, so that blocks erased to shallower levels are programmed prior to blocks erased to deeper levels. Thus, there is a shorter time between erase and program of memory blocks having shallower determined erase levels than for memory blocks having deeper determined erase levels.

The erase level to use for a block can be determined (e.g., assigned) based on one or more characteristics of the block, such as a measure of the age of the block, which can be a program erase count (PEC), and/or a temperature of the block. Older blocks are likely to have undergone greater threshold voltage shift. Accordingly, older blocks, such as blocks having higher program erase counts, are assigned to the shallow level so the older blocks are written earlier than newer blocks. Higher temperatures can cause the threshold voltage distributions of a cell to move faster, so blocks with higher temperature should be written to sooner. Accordingly, blocks having higher temperatures can be assigned to shallower levels so the hotter blocks are written prior to colder blocks.

Upon receiving a write command, the memory sub-system can identify an erased block having the shallowest determined erase level of the erased blocks that have not yet been programmed, and program the identified erase block to the determined erase level. In response to the write command, blocks erased to the shallow level (if any) are programed first, followed by blocks programmed to the medium level (if any), followed by blocks programmed to the deep level (if any).

Although blocks erased to shallower levels have erase states closer to the program voltages and are therefore more likely to encounter errors resulting from threshold voltage shift, blocks erased to shallower levels are programmed sooner than blocks erased to deeper levels because they are given priority when performing write operations in response to write commands. Further, although there is a longer time between erase and program of blocks having deeper determined erase levels, any threshold voltage shift of the erase level (e.g., level 0 charge gain) that occurs during on a block during the longer delay can be nullified by the deeper erase operation performed on the block.

The garbage collection component can store an indication of which erase level each block has been programmed to in a data structure, such as a set of block pools. For example, the garbage collection component can generate a first block pool that includes a set of block identifiers identifying blocks programmed to the shallow level, a second block pool that includes a set of block identifiers that identify blocks programmed to the medium level, and a third block pool that includes a set of block identifiers identifying blocks programmed to the deep level. Each block pool can include identifiers of blocks having characteristics that satisfy a threshold value or range associated with the respective block pool. Although three block pools are described in this example, the number of block pools can be varied to achieve a desired granularity of erase levels.

The memory sub-system can, upon receiving a write command, identify an erased block having the shallowest determined erase level of the erased blocks by scanning the block pools in order of increasing pool depth level for an erased block. If the first pool (which corresponds to the shallow erase level) contains an erased block, then the erased block from the first pool can be programmed with data specified in the write command. If the first pool does not contain an erased block, but the second pool (which corresponds to the medium erase level) does, then the erased block from the second pool can be programmed with the data. Otherwise, if the third pool (which corresponds to the deep erase level) contains an erased block, then the erased block can be programmed with the data. The erased block can be removed from the pool upon being programmed. If none of the pools contain an erased block, then the garbage collection component can be invoked to identify and erase a candidate block, or a block that has not previously been programmed can be used, for example.

Advantages of the present disclosure include, but are not limited to, improved performance and increased lifetime of a memory sub-system. Since garbage collection erase operations can be performed during idle time, the throughput for write commands is greater than for on-demand garbage collection techniques, in which each write command can include an erase prior to performing a write operation. The disclosed dynamic erase depth adjustment technique mitigates the effects of threshold voltage drift (e.g., charge gain) on erased memory blocks, since erased blocks having characteristics that correspond to greater and/or faster threshold voltage drift are written sooner than other erased memory blocks. For example, assigning blocks having characteristics that correspond to greater and/or faster threshold voltage drift to shallower erase levels and prioritizing blocks erased to shallower thresholds in write operations can prevent the erase level distribution of a block from drifting into the same voltage range as the first program level distribution prior to the write operation. Accordingly, reliability statistics, such as the block error rate, need not be adversely affected by the delay between erase and write operations on a block. Further, since blocks can be erased to different depths during garbage collection, program operations performed in response to write commands can select a block of appropriate erase depth depending on whether the block is to be written in single-level cell mode (e.g., appropriate for shallow erase depth) or multi-level cell mode (e.g., appropriate for deep erase depth). Since shallow erase operations cause less wear than deeper erase operations, device lifetime can be increased when at least some write operations use single-level cell mode.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, a vehicle (e.g., airplane, drone, train, automobile, or other conveyance), Internet of Things (IoT) devices, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory component can include an SLC portion, and an MLC portion, a TLC portion, or a QLC portion of memory cells. The memory cells of the memory devices 130 can be grouped as pages or codewords that can refer to a logical unit of the memory device used to store data. With some types of memory (e.g., NAND), pages can be grouped to form blocks. Some types of memory, such as 3D cross-point, can group pages across dice and channels to form management units (MUs).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes an erase level modulation component 113 that can be used to perform media management operations, such as garbage collection, that classify candidate blocks, e.g., blocks having invalid date or otherwise available for garbage collection, into different erase levels based on one or more characteristics of each block, and erase each respective candidate block to an erase depth that corresponds to the block's respective erase level. The erase levels can include, for example, a shallow erase level, a medium erase level, and a deep erase level, in order from shallowest to deepest.

Upon receiving a write command, the media management component 113 can select an erased block having a shallowest associated erase level of the erased blocks, and program the data specified by the write command into the selected erased block. In some embodiments, each erase level can be associated with a block pool that can contain a set of blocks (or block identifiers). Each erased block can be associated with the block pool that corresponds to the erase level determined for the block. In some embodiments, upon receiving a write command, the erase level modulation component 113 can identify an erased block in a shallowest block pool that contains at least one erased block. The erase level modulation component 113 can then program the data specified by the write command into the identified erase block, and remove the identified erase block from its containing block pool. Further details relating to the operations of the erase level modulation component 113 are described below.

Figure 2:
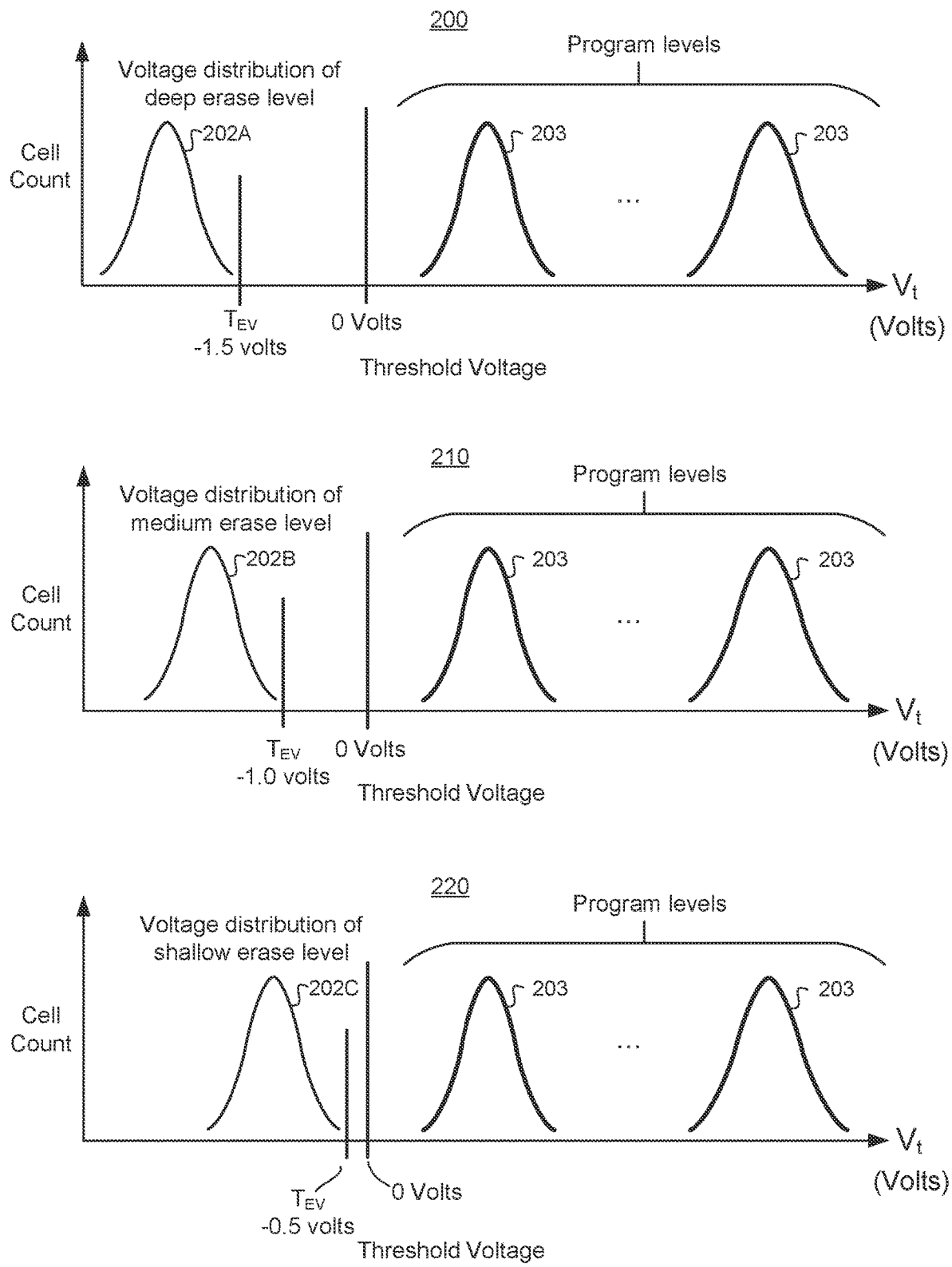
FIG. 2 illustrates examples of erasing memory blocks to different depth levels in accordance with some embodiments.

FIG. 2 illustrates examples of erasing memory blocks to different depth levels in accordance with some embodiments. A first graph 200 illustrates a deep erase voltage distribution 202A of a memory cell. The cell has been erased to a deep erase level, and the resulting deep erase distribution 202A is located to the left of an example deep threshold erase-verify voltage $T_{EV}$=−1.5 volts. Voltages less than $T_{EV}$=−1.5 volts correspond to the deep erase level of the memory cell in graph 200. The cell can also have one or more program distributions. For example, a single-layer cell may have a single program distribution 203 in addition to the erase distribution 202A. A triple-layer cell may have seven program distributions in addition to the erase distribution 202A, each corresponding to a program level (e.g., possible data value) of the cell.

A second graph 210 illustrates a medium erase voltage distribution 202B of a memory cell. The cell has been erased to a medium erase level, and the resulting medium erase distribution 202B is located to the left of an example medium threshold erase-verify voltage $T_{EV}$=−1.0 volts. Voltages less than $T_{EV}$=−1.0 volts correspond to the medium erase level of the memory cell in graph 210. The medium erase level is shallower than the deep erase level. Accordingly, the medium erase level has a greater $T_{EV}$ value than the deep erase level, and the medium erase voltage distribution 202B is not as far to the right of the graph as that of the deep erase level 202A. Thus, the medium erase distribution 202B is closer to the lowest program voltage distribution 203 than is the deep erase distribution 202A.

A third graph 220 illustrates a shallow erase voltage distribution 202C of a memory cell. The cell has been erased to a shallow erase level, and the resulting shallow erase distribution 202C is located to the left of an example shallow threshold erase-verify voltage $T_{EV}$=−0.5 volts. Voltages less than $T_{EV}$=−0.5 volts correspond to the shallow erase level of the memory cell in graph 220. The shallow erase level is shallower than the medium erase level (and the deep erase level). Accordingly, the shallow erase level has a greater $T_{EV}$ value than the medium erase level (and the deep erase level), and the shallow erase voltage distribution 202C is not as far to the left of the graph as the medium erase voltage distribution 202B (and the deep erase voltage distribution 202A). Thus, the shallow erase distribution 202C is closer to the lowest program voltage distribution 203 than is the medium erase distribution 202B.

FIG. 3 illustrates example memory block characteristics data 300 in accordance with some embodiments. The characteristics data 300 includes a number of entries, and each entry includes an indication of a block 302, a program erase count (PEC) 304 of the block, and a temperature 306 of the block. The characteristics data 300 can be determined by the memory sub-system 110, and can be used by a memory sub-system controller 115 to determine an erase depth (or block pool) of the block 302, such as the erase level 404 described below with respect to FIG. 4. The memory sub-system controller 115 can determine each program erase count 304 by counting erase operations that occur for each block, e.g., between the time that the block is make available for writing and a current time at which the data 300 is determined. The memory sub-system controller 115 can determine the temperature 306 using a temperature sensor that measures the operating temperature of a die on which the block is stored. The temperature may be measured at a physical location on the die that corresponds to the block, for example. Each of the PEC values 304 is classified as corresponding to a shallow erase, a medium erase, or a deep erase according to a PEC range into which the PEC value falls. The example PEC ranges and respective erase level classifications used in FIG. 3 are shown in Table 1 below.

TABLE 1

| Program Erase Count Range | Erase Level |
| --- | --- |
| 0-9 | Shallow Erase |
| 10-99 | Medium Erase |
| 100-Maximum count | Deep Erase |

As shown in FIG. 3, in this example, according to the PEC column 304, block 2 has PEC=1, which is classified as the shallow erase level. Further, block 13 has PEC=91, classified as the medium erase level, and block 15 has PEC=101, classified as the deep erase level. The remaining example blocks and their PEC-based classifications are block 28 having PEC=1 (shallow), block 35 having PEC=301 (deep), block 56 having PEC=20 (medium), block 63 having PEC=3 (shallow), block 72 having PEC=2 (shallow), block 82 having PEC=324 (deep), and block 99 having PEC=12 (medium).

Similarly, each of the temperature values 306 is classified as corresponding to a shallow erase, a medium erase, or a deep erase according to a temperature range into which the temperature value falls. The example temperature ranges and respective erase level classifications used in FIG. 3 are shown in Table 2 below.

TABLE 2

| Temperature Range (° C.) | Erase Level |
| --- | --- |
| 0-59 | Deep Erase |
| 60-69 | Medium Erase |
| 70-Maximum temp. | Shallow Erase |

According to the temperature column 306, the blocks are classified into erase levels based on temperature as follows: block 2 has temperature=71 (degrees C.), which is classified as the shallow erase level. Further, block 13 has temperature=61, classified as the medium erase level, and block 15 has temperature=51, classified as the deep erase level. The remaining example blocks and their temperature-based classifications are block 28 having temperature=52 (deep), block 35 having temperature=61 (medium), block 56 having temperature=92 (shallow), block 63 having temperature=41 (deep), block 72 having temperature=60 (medium), block 82 having temperature=71 (shallow), and block 99 having temperature=59 (deep).

As can be seen in FIG. 3, the PEC-based erase level classification is the same as the temperature-based depth classification for some blocks. For other blocks, however, the two classifications are different. For example, for block 28, the PEC-based classification is the shallow erase level, but the temperature-based classification is the deep erase level. Since each block is erased to a single erase level by the garbage collector, differing PEC-based and temperature-based classifications can be converted to a single classification using an average or weighted average of the two classifications. As an example, the two classifications can each be converted to a numeric value in the range 1-3, and an average or weighted average of the two numeric values can be calculated and converted back to a single classification. If weighted averages are used, the weight of each numeric value can be based on an amount by which the respective data characteristic value (e.g., program erase count 304 or temperature 306) is greater than a median of the associated PEC range (for PEC-based classification, for which smaller values correspond to shallower erase levels) or less than a median of the associated temperature range (for temperature-based classifications, for which larger values correspond to shallower erase levels). In another example, the range of possible PEC values 304 (e.g., 0 to a maximum count) and the temperature values 306 (e.g., 59° C. to a maximum temperature) can be normalized to the same scale (e.g., 1 to 100 for both PEC and temperature), and an average of the normalize PEC value and the normalized temperature value can be calculated. The average can then be classified as a shallow, medium, or deep erase level using appropriate respective ranges.

Other suitable techniques for mapping two different erase levels to a single erase level are possible. For example, block 28 in FIG. 3 has a PEC-based classification of shallow erase, and a temperature based classification of deep erase. An average of the shallow and deep classifications can be a medium classification.

FIG. 4 illustrates an example block erase depth table 400 in accordance with some embodiments. The erase depth table 400 includes a number of entries, and each entry includes an indication of a block 402 and an indication of an erase level 404. The erase level can be a numeric value 1, 2, or 3, where 1 corresponds to the shallow erase level, 2 corresponds to the medium-depth erase level, and 3 corresponds to the deep erase level. Thus, larger numeric erase level values can correspond to deeper erase levels. The erase level numbers can also identify block pool. For example, erase level 1 can correspond to a first block pool (e.g., block pool 1, containing shallow-erased blocks), erase level 2 can correspond to a second block pool (e.g., block pool 2, containing medium-depth-erased), and erase level 3 can correspond to a third block pool (e.g., block pool 3, containing deep-erased blocks).

The example erase levels 404 shown in FIG. 4 are determined based on the block characteristics data shown in FIG. 3. For each entry in the table 300, the PEC value 304 and the temperature value 306 are mapped to an erase level 404. If the PEC and temperature values are both classified as the same erase level (e.g., both are shallow, as in the case of block 2), then the erase level can be used as the erase level 404 of table 400. Otherwise, if the PEC and temperature values are classified as two different erase levels, then the two different erase levels can be mapped to a single erase level using a technique such as averaging or other mapping, e.g., as described above with respect to FIG. 3. The classifications of the example PEC values 304 and temperature values 306 are shown in table 300 in parentheses. The example erase level (or block pool) 404 in shown in table 400 for each example block are as follows: block 2 has an erase level of shallow, since both the PEC and temperature are classified as the shallow erase level according to the ranges shown in Tables 1 and 2 above. Similarly, block 13 has an erase level of medium, and block 15 has an erase level of deep. For block 28, the PEC-based classification is shallow, and the temperature-based classification is deep. The deep level and the shallow level can be averaged to the medium level, which is the erase level 404 shown for block 28 in table 400.

As another example, block 35 has a PEC-based classification of deep, and a temperature-based classification of medium. Since the PEC value (301) is in the deep erase range and substantially different from the value of the boundary value between the medium and deep ranges (e.g., 100), and the temperature value (61) is not as substantially different from the boundary value between the medium and deep ranges, the PEC-based classification (deep) can be given higher weight than the temperature-based classification (medium). Accordingly, the resulting erase level 404 is the deep erase level. The erase levels of blocks 35, 56, 63, 72, 82, and 99 can be determined similarly to the blocks described above, or using other suitable mappings from characteristics data 300 to erase levels 404.

Figure 5:
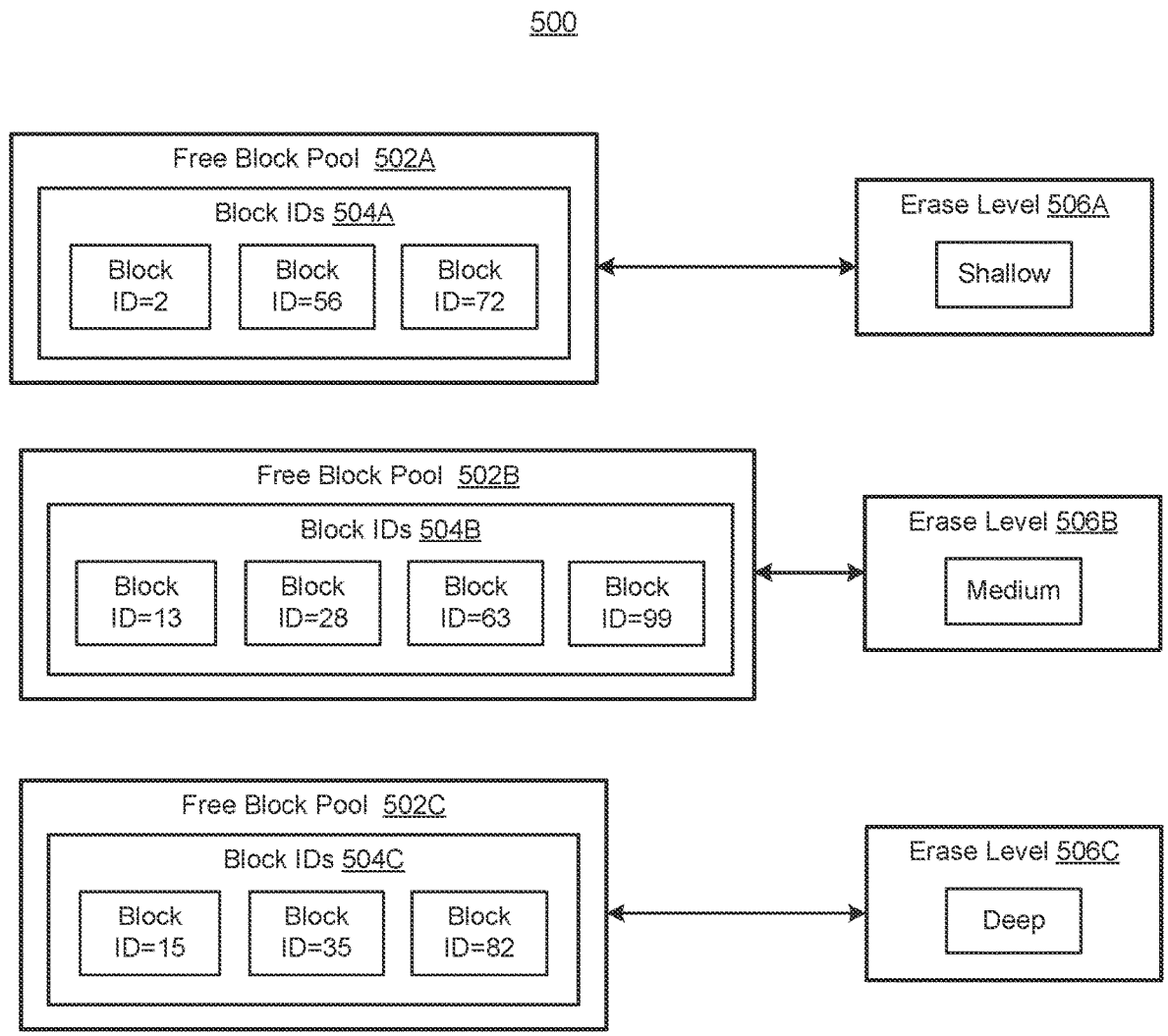
FIG. 5 illustrates an example block pool data structure in accordance with some embodiments.

FIG. 5 illustrates an example block pool data structure 500 in accordance with some embodiments. The data structure 500 can include one or more free block pools 502. Each free block pool 502 represents one or more blocks that have been erased and are available to be programmed. The blocks are identified by one or more block identifiers 504. Each free block pool 502 is associated with a respective erase level 506. For example, a first free block pool 502A corresponds to a shallow erase level 506A, a second free block pool 502B corresponds to a medium erase level 506B, and a third free block pool 502C corresponds to a deep erase level 506C. In the example data structure 500, the first free block pool 502A includes block identifiers 504A (2, 56, and 72), which the associated erase level 506A indicates have been erased to a shallow erase level. The second free block pool 502B includes block identifiers 504B (13, 28, 63, and 99), which the associated erase level 506B indicates have been erased to a medium erased level. The third free block pool 502C includes block identifiers 504C (15, 35, 82), which the associated erase level 506C indicates have been erased to a deep erase level.

FIG. 6 is a flow diagram of an example method 600 to erase blocks that are available for garbage collection to respective depth levels determined based on characteristics of the blocks and to write to the erased blocks in order of their respective depth levels in accordance with some embodiments. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the erase level modulation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some embodiments, operations 602-606 can be performed by a garbage collection component or other component of memory sub-system controller 115. At operation 602, the processing logic can identify one or more candidate memory blocks that are available for garbage collection. The candidate memory blocks can be, for example, blocks that have previously been programmed with data but for which the data has become invalid. At operation 604, the processing logic can determine a respective erase depth level for each candidate memory block based on one or more block characteristics of the candidate memory block. The block characteristics can include a program erase count 304 and/or a temperature 306 of each block. The erase level of each candidate memory block can be determined as described above with reference to the erase level 404, for example. The erase level can be one of a set of erase levels, e.g., a shallow erase level, a medium erase level, or a deep erase level. Although three erase levels are described in the examples herein, a different number of erase levels and/or different erase levels can be used in other examples. Other embodiments can use two possible erase levels (e.g., shallow and deep), or five possible erase levels (e.g., shallowest, medium shallow, medium, medium deep, and deep), for example.

At operation 606, the processing logic can erase the candidate memory blocks. The processing logic can erase each of the candidate memory blocks in accordance with the respective erase depth level determined for the candidate memory block. For example, the processing logic can erase each of the candidate memory blocks to the respective depth level. The memory sub-system controller 115 can specify the depth to which each memory block is erased. For example, the memory sub-system can specify sensing trim values that control a threshold erase-verify voltage, source and gate voltages, and/or other parameters to adjust the depth to which memory cells are erased. Deeper erase operations can cause the threshold voltages distributions to move to lower voltage levels (e.g., farther to the left) than shallower erase operations. For example, the erase depth is proportional to a program erase count of the candidate memory block. As another example, the erase depth level is inversely proportional to a temperature of the candidate memory block.

At operation 608, the processing logic can receive a request to write data. The request can be received subsequent to erasing the candidate memory blocks. The request can be, for example, a write command received from a user application or other program code running on the host system 120. The request can also be received from another component of the memory sub-system controller 115.

At operation 610, the processing logic can, responsive to receiving the request to write data, select a first memory block from the erased candidate memory blocks in accordance with the respective erase depth level of each of the erased candidate memory blocks. The processing logic can select the first memory block from the erased candidate memory blocks in an order based on the erase depth level of each of the erased candidate memory blocks. The order can be from a shallowest erase depth level to a deepest erase depth level of the erase candidate memory blocks. The selected first memory block can be a memory block in the shallowest erase depth level that is associated with at least one candidate memory block.

The first memory block can be selected from the erased candidate memory blocks based on a comparison of a first erase depth level of the first memory block to one or more second erase depth levels, where each of the second erase depth levels is associated with a respective second memory block of the one or more erased candidate memory blocks. In one example, the first erase depth level can be a shallower level than the second erase depth level. The respective erase depth level can be one of a set of erase depth levels, each of which is associated with respective threshold criteria that are satisfied by the one or more block characteristics of the candidate memory block. The threshold criteria associated with the respective erase depth level of each candidate memory block can include a respective range of values. The threshold criteria associated with the particular erase depth level of each candidate memory block can be satisfied if each of the one or more block characteristics of the candidate memory block is in the respective range of values.

The range of values can be specified by at least one threshold value. An example of three threshold criteria is shown in Table 1 above, in which a first threshold criterion specifies a program erase count range of 0-9, in which the threshold values are 0 and 9. The threshold criterion "0-9" is satisfied by a value between 0 and 9 (e.g., satisfied if 0<=value<=9). Alternatively, the first threshold criterion can be specified as "less than or equal to 9" in which case there is a single threshold value (9) in the threshold criterion. The first threshold criterion is associated with a shallow erase level. Table 1 also includes a second threshold criterion "10-99" that is satisfied by a value between 10 and 99 (e.g., 10<=value<=99) and associated with a medium erase level. Table 1 also includes a third threshold criterion "100-Maximum count", which is associated with a deep erase level and is satisfied by a value between 100 and a maximum count value (e.g., 100<=value<=maximum count). Alternatively, the threshold criterion can be satisfied by any value above 100 (e.g., "value>=100"). The threshold criterion can also include criteria based on another block characteristic, such as the temperature range criteria shown in Table 2 above. The program erase count criteria and temperature criteria can be evaluated as described above with respect to FIG. 3.

At operation 610, the processing logic can write data to the first memory block in accordance with the request to write data. For example, the request can be a write command, and the processing logic can program the first memory block with data specified in the write command.

FIG. 7 is a flow diagram of an example method 700 to erase a plurality of memory blocks that are available for garbage collection and generate a plurality of memory block pools based on characteristics of the memory blocks in accordance with some embodiments. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the erase level modulation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 700 can be performed by a garbage collection component or other component of memory sub-system controller 115. At operation 702, the processing logic can receive a request to perform garbage collection on one or more available memory blocks. For example, the processing logic can erase each of the candidate memory blocks to the respective depth level.

At operation 704, the processing logic can generate a plurality of memory block pools, wherein each memory block pool is associated with a respective erase depth level, and each memory block pool includes one or more memory blocks that each satisfy one or more threshold characteristics associated with the respective erase depth level. The processing logic can generate the memory block pools as described above with respect to the erase level or block pool 404 of FIG. 4, in which a block pool corresponding to each erase level can be generated. At operation 706, the processing logic can erase the memory blocks in each block pool based on the respective erase depth level associated with the block pool. For example, the processing logic can erase the memory blocks in each pool to the respective erase depth level associated with the pool.

FIG. 8 is a flow diagram of an example method 800 to write data to a particular erased memory block of a memory block pool that is associated with a shallowest erase depth of a plurality of erase depths in accordance with some embodiments. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the erase level modulation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 802, the processing logic can receive a request to write data. At operation 804, the processing logic can identify a memory block pool that is associated with a shallowest erase depth level of a plurality of erase depth levels and includes an erased memory block. The memory block pool associated with a shallowest erase depth level can be identified as described below with respect to FIG. 9, for example. At operation 806, the processing logic can program the memory blocks in each block pool based on the respective erase depth associated with the block pool.

Figure 9:
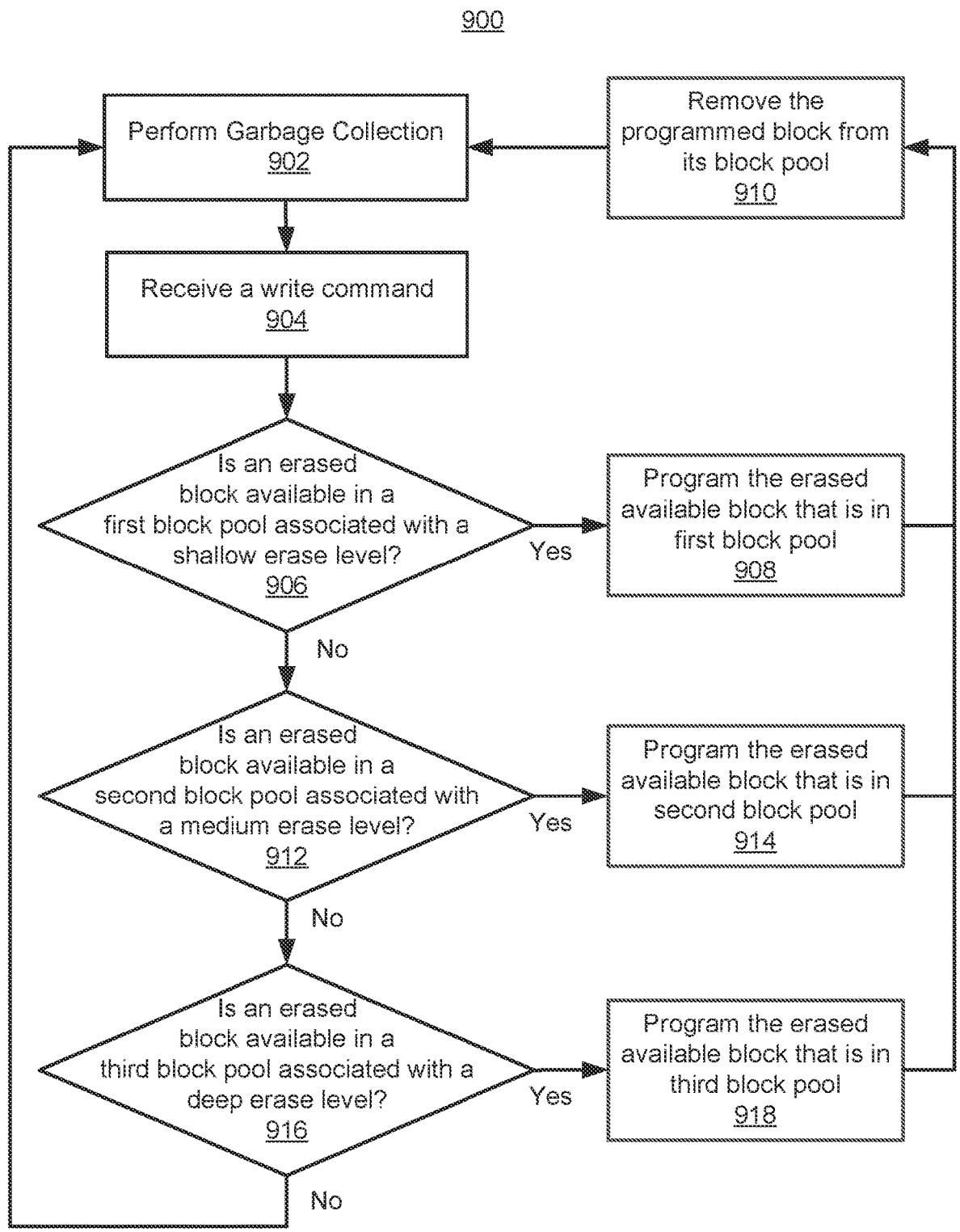
FIG. 9 is a flow diagram of an example method to identify an erased memory block of a memory block pool by searching a plurality of memory block pools in an order based on an erase level depth of each of the memory block pools in accordance with some embodiments.

FIG. 9 is a flow diagram of an example method 900 to identify an erased memory block of a memory block pool by searching a plurality of memory block pools in an order based on an erase level depth of each of the memory block pools in accordance with some embodiments. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the erase level modulation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 902, the processing logic can perform garbage collection, e.g., by performing the operations described in the method 700 with respect to FIG. 7. At operation 904, the processing logic can receive a write command. At operation 906, the processing logic can determine whether an erased block is available in a first block pool associated with a shallow erase level. If so, the processing logic can perform operation 908. At operation 908, the processing logic can program the erased available block that is in the first block pool. The processing logic can then perform operation 910. At operation 910, the processing logic can remove the programmed block from the block pool that contains the programmed block. The processing logic can then perform operation 902 again.

If operation 906 determines that there is not an erased block available in the first block pool associated with the shallow erase level, then the processing logic can perform operation 912. At operation 912, the processing logic can determine whether an erased block is available in a second block pool associated with a medium erase level. If so, the processing logic can perform operation 914. At operation 914, the processing logic can program the erased available block that is in the second block pool. The processing logic can then perform operations 910 and 902, as described above.

If operation 912 determines that there is not an erased block available in the second block pool associated with the medium erase level, then the processing logic can perform operation 916. At operation 916, the processing logic can determine whether an erased block is available in a third block pool associated with a deep erase level. If so, the processing logic can perform operation 918. At operation 918, the processing logic can program the erased available block that is in the third block pool. The processing logic can then perform operations 910 and 902, as described above. If operation 916 determines that there is not an erased block available in the second block pool associated with the medium erase level, then the processing logic can perform operation 902 again.

Figure 10:
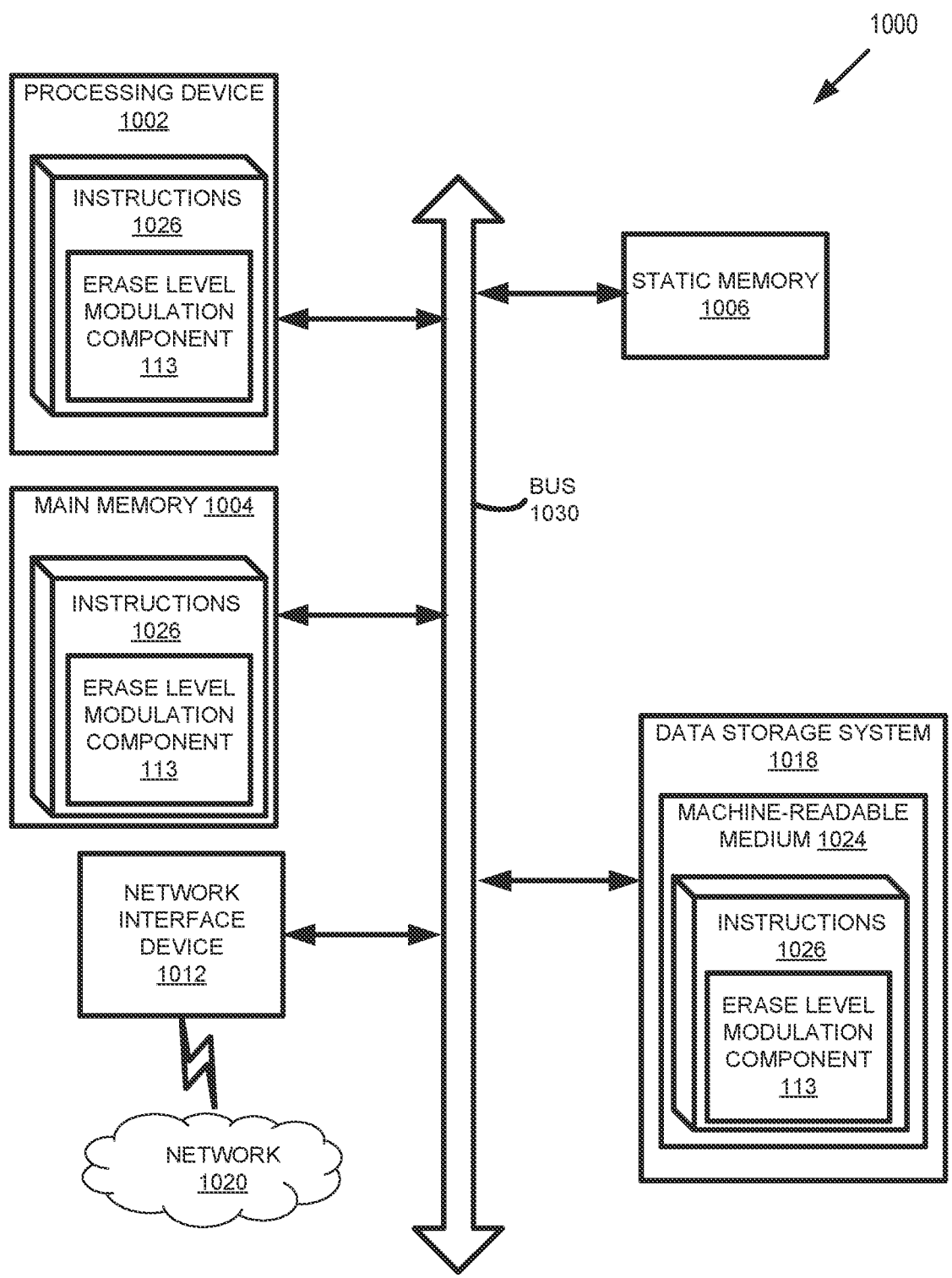
FIG. 10 is a block diagram of an example computer system in which implementations of the present disclosure can operate.

FIG. 10 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a erase level modulation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein. The computer system 1000 can further include a network interface device 1008 to communicate over the network 1020.

The data storage system 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIG. 1.

In one embodiment, the instructions 1026 include instructions to implement functionality corresponding to a read voltage adjustment component (e.g., the erase level modulation component 113 of FIG. 1). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled to the memory device, to perform operations comprising:
identifying one or more candidate memory blocks that are available for garbage collection;
determining a respective erase depth level for each candidate memory block based on one or more block characteristics of the candidate memory block;
erasing the candidate memory blocks, wherein each of the candidate memory blocks is erased in accordance with the respective erase depth level determined for the candidate memory block;
receiving a request to write data subsequent to erasing the candidate memory blocks; and
responsive to receiving the request to write data, selecting a first memory block from the erased candidate memory blocks in accordance with the respective erase depth level of each of the erased candidate memory blocks.

2. The system of claim 1, wherein the respective erase depth level is one of a plurality of erase depth levels, wherein each erase depth level is associated with respective threshold criteria, and wherein the respective threshold criteria associated with the respective erase depth level of each candidate memory block are satisfied by the one or more block characteristics of the candidate memory block.

3. The system of claim 2, wherein the respective threshold criteria associated with the respective erase depth level of each candidate memory block comprise a respective range of values, and wherein the threshold criteria associated with the respective erase depth level of each candidate memory block are satisfied if each of the one or more block characteristics of the candidate memory block is in the respective range of values.

4. The system of claim 2, wherein the one or more block characteristics of the candidate memory block include a program erase count of the candidate memory block.

5. The system of claim 4, wherein the threshold criteria associated with each erase depth level include a respective program erase count criterion that is satisfied if the program erase count of the candidate memory block is in a respective range of values included in the respective program erase count criterion.

6. The system of claim 2, wherein the one or more block characteristics of the candidate memory block include a temperature of the candidate memory block.

7. The system of claim 1, wherein erasing the candidate memory blocks comprises adjusting one or more trim parameters of each of the respective candidate memory blocks, wherein the one or more trim parameters are based on the respective erase depth level of the respective candidate memory block.

8. The system of claim 1, wherein the first memory block is selected from the erased candidate memory blocks in an order based on the respective erase depth level of each of the erased candidate memory blocks.

9. The system of claim 8, wherein the order is from a shallowest erase depth level to a deepest erase depth level.

10. The system of claim 8, wherein the first memory block is selected from the erased candidate memory blocks based on a comparison of a first erase depth level of the first memory block to one or more second erase depth levels, wherein each of the second erase depth levels is associated with a respective second memory block of the erased candidate memory blocks, and the first erase depth level is a shallower level than the second erase depth level.

11. The system of claim 1, wherein the first memory block is a memory block in a shallowest erase depth level that is associated with at least one candidate memory block.

12. The system of claim 1, the operations further comprising:
responsive to selecting the first memory block, writing data to the first memory block in accordance with the request to write data.

13. The system of claim 1, wherein identifying one or more candidate memory blocks is responsive to a request to perform garbage collection on the one or more candidate memory blocks.

14. The system of claim 1, wherein the candidate memory blocks comprise one or more memory blocks available for garbage collection.

15. A method comprising:
receiving, by a processing device, a request to perform garbage collection on one or more available memory blocks;
generating a plurality of memory block pools, wherein each memory block pool is associated with a respective erase depth level, and each memory block pool includes one or more memory blocks that each satisfy one or more threshold characteristics associated with the respective erase depth level; and
erasing the memory blocks in each block pool based on the respective erase depth level associated with the block pool.

16. The method of claim 15, wherein the one or more threshold characteristics associated with the respective erase depth level comprise one or more of a program erase count of at least of the available memory blocks or a temperature of at least of the available memory blocks.

17. The method of claim 15, further comprising:
receiving a request to write data;
identifying a memory block pool that is associated with a shallowest erase depth level of a plurality of erase depth levels and includes an erased memory block; and
writing the data to the erased memory block.

18. A non-transitory machine-readable storage medium storing instructions that cause a processing device to perform operations comprising:
- receiving, by a processing device, a request to perform garbage collection on one or more available memory blocks;
- generating a plurality of memory block pools, wherein each memory block pool is associated with a respective erase depth level, and each memory block pool includes one or more memory blocks that each satisfy one or more threshold characteristics associated with the respective erase depth level; and
- erasing the memory blocks in each block pool based on the respective erase depth level associated with the block pool.

19. The non-transitory machine-readable storage medium of claim 18, wherein the one or more threshold characteristics associated with the respective erase depth level comprise one or more of a program erase count of at least of the available memory blocks or a temperature of at least of the available memory blocks.

20. The non-transitory machine-readable storage medium of claim 18, the operations further comprising:
- receiving a request to write data;
- identifying a memory block pool that is associated with a shallowest erase depth level of a plurality of erase depth levels and includes an erased memory block; and
- writing the data to the erased memory block.

* * * * *